(12) United States Patent
Li et al.

(10) Patent No.: US 10,205,180 B2
(45) Date of Patent: Feb. 12, 2019

(54) PASSIVE DIRECT LIQUID FUEL CELL AND ITS PREPARING METHOD

(71) Applicant: XI'AN JIAOTONG UNIVERSITY, Xi'an, Shaanxi (CN)

(72) Inventors: Yinshi Li, Shaanxi (CN); Yaling He, Shaanxi (CN); Yubing Tao, Shaanxi (CN)

(73) Assignee: XI'AN JIAOTONG UNIVERSITY, Xi'an, Shaanxi (CN)

( * ) Notice: Subject to any disclaimer, the term of this patent is extended or adjusted under 35 U.S.C. 154(b) by 76 days.

(21) Appl. No.: 15/541,488

(22) PCT Filed: Oct. 13, 2016

(86) PCT No.: PCT/CN2016/102003
§ 371 (c)(1),
(2) Date: Jul. 5, 2017

(87) PCT Pub. No.: WO2017/067417
PCT Pub. Date: Apr. 27, 2017

(65) Prior Publication Data
US 2018/0026277 A1    Jan. 25, 2018

(30) Foreign Application Priority Data
Oct. 20, 2015    (CN) .......................... 2015 1 0683882

(51) Int. Cl.
*H01M 8/00*    (2016.01)
*H01M 8/0297*    (2016.01)
(Continued)

(52) U.S. Cl.
CPC ....... *H01M 8/0297* (2013.01); *H01M 8/0247* (2013.01); *H01M 8/0258* (2013.01); *H01M 8/0276* (2013.01); *H01M 8/0286* (2013.01); *H01M 8/04201* (2013.01); *H01M 8/1004* (2013.01); *H01M 8/1009* (2013.01); *B33Y 10/00* (2014.12); *B33Y 50/02* (2014.12); *Y02P 70/56* (2015.11)

(58) Field of Classification Search
CPC ....................................................... H01M 8/00
See application file for complete search history.

(56) References Cited

U.S. PATENT DOCUMENTS

2015/0200401 A1\*    7/2015    Vandenborre ........... C25B 11/02
429/422

\* cited by examiner

*Primary Examiner* — Jacob B Marks

(57) ABSTRACT

A passive direct liquid fuel cell is provided, which relates to a fuel cell field, including a current-collector-integrated fuel tank unit and a sealing-fastening-integrated current-collector which are prepared via a three-dimensional (3D) printing technology. The current-collector-integrated fuel tank unit is fastened with the sealing-fastening-integrated current-collector, and a membrane electrode assembly is sandwiched between the current-collector-integrated fuel tank unit and the sealing-fastening-integrated current-collector. Because of designs of current collectors, a fuel tank and a sealing fastening manner, an integration of the current collectors, the fuel tank and fasteners is realized. The current-collector-integrated fuel tank unit and the sealing-fastening-integrated current-collector are rapidly formed via the 3D printing technology, so that the whole fuel cell has a compact and simple structure, a lighter weight and a smaller volume.

6 Claims, 3 Drawing Sheets

(51) Int. Cl.
*H01M 8/0247* (2016.01)
*H01M 8/0258* (2016.01)
*H01M 8/0276* (2016.01)
*H01M 8/0286* (2016.01)
*H01M 8/04082* (2016.01)
*H01M 8/1004* (2016.01)
*H01M 8/1009* (2016.01)
*B33Y 10/00* (2015.01)
*B33Y 50/02* (2015.01)

PASSIVE DIRECT LIQUID FUEL CELL AND ITS PREPARING METHOD

CROSS REFERENCE OF RELATED APPLICATION

This is a U.S. National Stage under 35 U.S.C. 371 of the International Application PCT/CN2016/102003, filed Oct. 13, 2016, which claims priority under 35 U.S.C. 119(a-d) to CN 201510683882.0, filed Oct. 20, 2015.

BACKGROUND OF THE PRESENT INVENTION

Field of Invention

The present invention relates to a field of fuel cell, and more particularly to a passive direct liquid fuel cell and its preparing method.

Description of Related Arts

In order to alleviate the problems of both energy shortage and environmental pollution, currently, fuel cells that possess advantages of environmental friendliness, high energy-conversion efficiency and fast start-up have attracted the increasing attention. Generally, the fuel cells have a cubic structure, in which bolts are required to fix the membrane electrode assembly, causing a relatively heavy and complex structure, and thus increasing a production cost.

SUMMARY OF THE PRESENT INVENTION

An object of the present invention is to propose a passive direct liquid fuel cell and its preparing method, so as to solve the above-mentioned problems. A three-dimensional (3D) printing technology is applied to the fuel cell, so that the number of additional parts of the fuel cell is greatly decreased, which is beneficial to decreasing a volume and a weight of the fuel cell, for enabling a structure thereof to be more compact, and leading to more convenient production and assembly of the fuel cell.

In order to accomplish the above object, the present invention adopts following technical solutions.

A passive direct liquid fuel cell comprises a current-collector-integrated fuel tank unit and a sealing-fastening-integrated current-collector, which are prepared via a 3D printing technology, wherein the current-collector-integrated fuel tank unit is fastened with the sealing-fastening-integrated current-collector; and a membrane electrode assembly is sandwiched between the current-collector-integrated fuel tank unit and the sealing-fastening-integrated current-collector.

The current-collector-integrated fuel tank unit comprises a fuel tank and an anode current collector, which are coupled together, wherein: a fuel adding hole and fixed fastening grooves that cooperate with the sealing-fastening-integrated current-collector are provided on the fuel tank; and square fuel holes are provided on the anode current collector.

A surface of the anode current collector is lower than a surface of the fuel tank, which is beneficial to fixing and assembling the membrane electrode assembly.

The sealing-fastening-integrated current-collector comprises a cathode current collector which serves as a main part, wherein: on a surface of the cathode current collector, a convex structure is set, and a plurality of air holes corresponding to the fuel holes on the anode current collector are provided; and a plurality of fixed fasteners respectively cooperating with the fixed fastening grooves on the fuel tank are arranged around the cathode current collector.

The membrane electrode assembly comprises an ion-exchange membrane sandwiched between an anode electrode and a cathode electrode, wherein: an anode gasket and a cathode gasket are respectively placed on outer sides of the anode electrode and the cathode electrode, for avoiding fuel leakage.

A method for preparing the passive direct liquid fuel cell comprises steps of:

(1) building models of the current-collector-integrated fuel tank unit and the sealing-fastening-integrated current-collector via a 3D modeling software, printing the models via the 3D printing technology, and obtaining the current-collector-integrated fuel tank unit and the sealing-fastening-integrated current-collector; and (2) successively arranging the anode gasket, the anode electrode, the ion-exchange membrane, the cathode electrode and the cathode gasket on the anode current collector of the current-collector-integrated fuel tank unit; then covering the sealing-fastening-integrated current-collector on the membrane electrode assembly; inserting the fixed fasteners into the fixed fastening grooves, so as to seal and fasten the whole cell; and finishing production of the whole cell.

Compared with prior arts, the present invention has following beneficial effects.

(1) For the current-collector-integrated fuel tank unit, the fuel tank and the anode current collector are coupled together via the 3D printing technology, wherein the anode current collector is printed with a conductive 3D printing material, leading to the simpler and more compact structure and the decreased weight.

(2) For the sealing-fastening-integrated current-collector, sealing fastening parts and the cathode current collector are coupled together via the 3D printing technology, wherein the cathode current collector is printed with the conductive 3D printing material, leading to the simpler and more compact structure and the decreased weight.

(3) The cathode current collector adopts the convex structure, which is beneficial to an even stress distribution of the cathode current collector, so that the membrane electrode assembly is more tightly attached to the cathode current collector and a contact resistance is decreased.

(4) The fixed fasteners and the fixed fastening grooves are coupled, which saves conventional fastening parts such as bolts and enables the system to be more compact and lighter.

(5) The conductive 3D printing material cooperates with the non-conductive 3D printing material. Through the designs of the current-collector-integrated fuel tank unit and the sealing-fastening-integrated current-collector, the current collector is avoided being singly arranged, which enables the system to be more compact and lighter.

(6) Via the 3D printing technology, an individualized design of a single cell and an integrated cell stack are easily realized, which is beneficial to meeting the design and use of the cell under different situations.

(7) The 3D printing technology is able to meet machining of a compact and complex structure and easily realize batch production and integrated forming, which is beneficial to a market promotion of a mature technology.

(8) A three-dimensional shape of the present invention can be freely changed according to actual requirements.

In figures: 1: current-collector-integrated fuel tank unit; 2: membrane electrode assembly; 3: sealing-fastening-integrated current-collector; 4: anode current collector; 5: fuel tank; 6: fuel holes; 7: fixed fastening grooves; 8: anode gasket; 9: anode electrode; 10: ion-exchange membrane; 11: cathode electrode; 12: cathode gasket; 13: convex structure; 14: air holes; 15: fixed fasteners; 16: fuel adding hole; and 17: cathode current collector.

DETAILED DESCRIPTION OF THE PREFERRED EMBODIMENT

The present invention is further described in detail with the accompanying drawings as follows.

Figure 1:
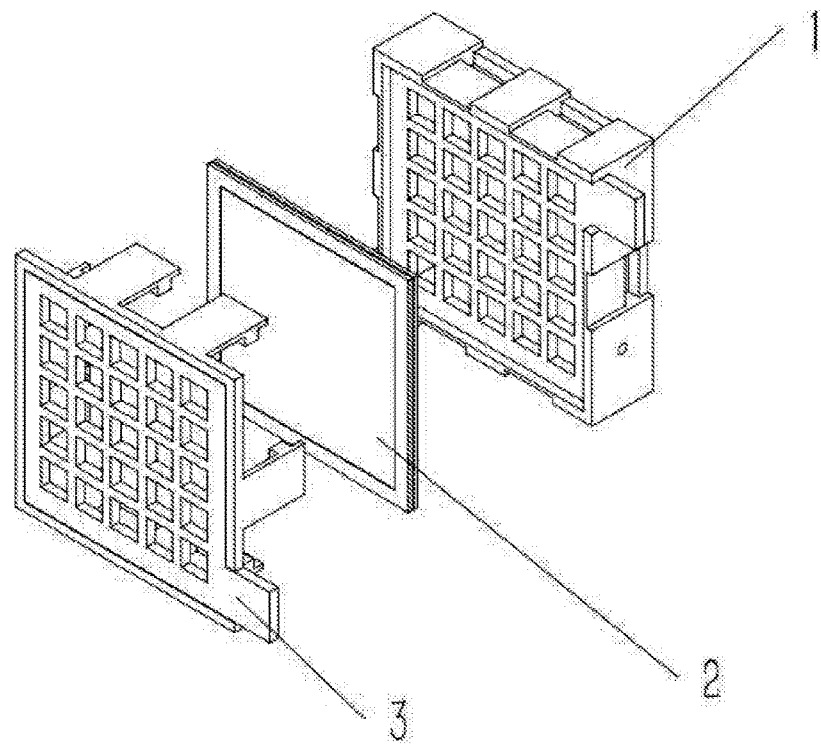
FIG. 1 is an enlarged axonometric drawing of an exploded view of a passive direct liquid fuel cell according to a preferred embodiment of the present invention.

Referring to FIG. 1, according to a preferred embodiment of the present invention, a passive direct liquid fuel cell comprises a current-collector-integrated fuel tank unit 1, a membrane electrode assembly 2 and a sealing-fastening-integrated current-collector 3.

Part I: Current-Collector-Integrated Fuel Tank Unit 1

The present invention provides a production plan that a fuel tank and an anode current collector are coupled together. In order that the fuel cell has a more compact structure, the whole cell is fixed without using a bolt. A three-dimensional (3D) printing technology is applied for coupling the anode current collector 4 and the fuel tank 5 together, wherein: enough square fuel holes 6 are provided on the anode current collector 4, so that fuel fully contacts an electrode; and meanwhile, fixed fastening grooves 7 are provided around the fuel tank 5 for sealing and fastening. In order to facilitate production and meanwhile meet some micro-size machining requirements, a 3D modeling software is applied for building a model of the current-collector-integrated fuel tank unit, and the anode current collector 4 is prepared through printing with a conductive 3D printing material, so that the production of the current-collector-integrated fuel tank unit 1 is finished.

Figure 2:
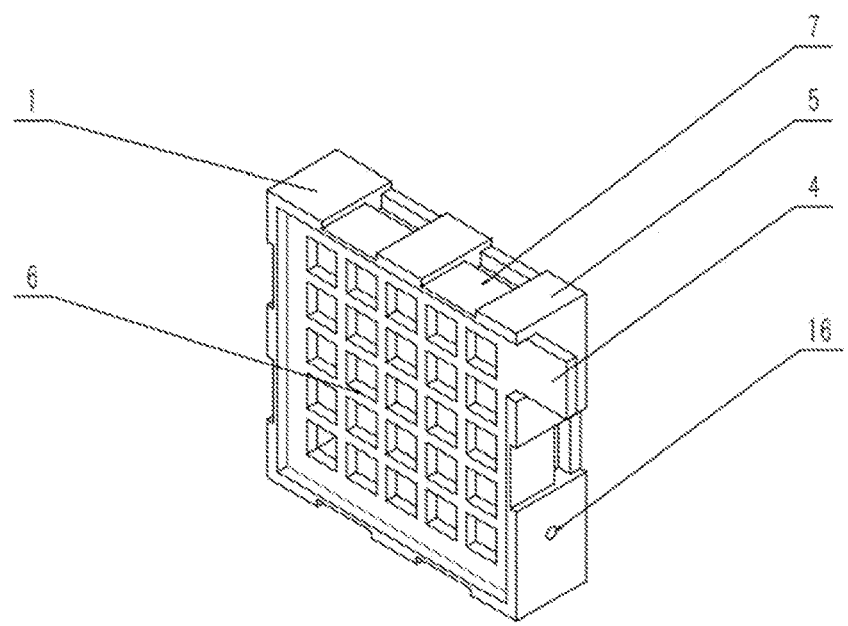
FIG. 2 is an enlarged axonometric drawing of a current-collector-integrated fuel tank unit according to the preferred embodiment of the present invention.

As showed in FIG. 2, the current-collector-integrated fuel tank unit 1 comprises the fuel tank 5, the anode current collector 4, the square fuel holes 6, a fuel adding hole 16 and the fixed fastening grooves 7. Because of the relatively complex structure and difficult machining when a size is relatively small, the model of the current-collector-integrated fuel tank unit is built via the 3D modeling software and thereafter printed via the 3D printing technology, wherein the anode current collector is printed with the conductive 3D printing material.

Part II: Membrane Electrode Assembly 2

Figure 3:
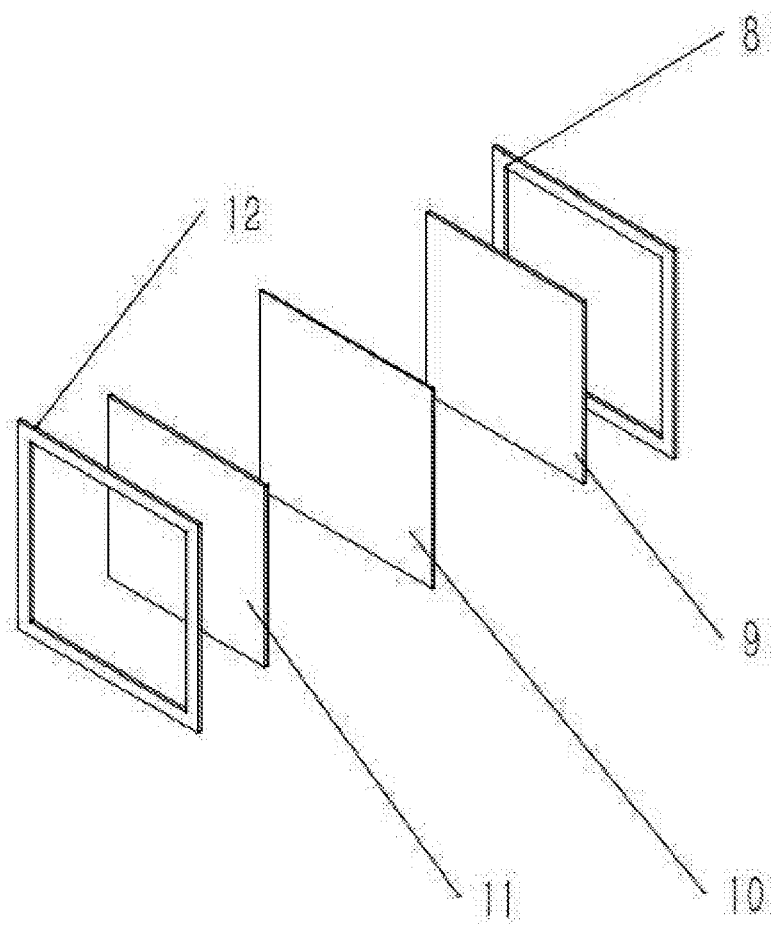
FIG. 3 is an enlarged axonometric drawing of an exploded view of a membrane electrode assembly according to the preferred embodiment of the present invention.

As showed in FIG. 3, the membrane electrode assembly 2 comprises an anode gasket 8, an anode electrode 9, an ion-exchange membrane 10, a cathode electrode 11 and a cathode gasket 12, wherein the cathode gasket 12 is for effectively avoiding fuel leakage.

Part III: Sealing-Fastening-Integrated Current-Collector 3

The sealing-fastening-integrated current-collector 3 is mainly for sealing, fastening and collecting. A cathode current collector 17 is prepared through printing with the conductive 3D printing material and has a convex structure 13. Enough square air holes 14 are provided on the cathode current collector 17, so that air fully contacts the cathode electrode 11. Meanwhile, fixed fasteners 15 are arranged around the cathode current collector 17, for respectively cooperating with the fixed fastening grooves 7 of the current-collector-integrated fuel tank unit 1, thereby sealing and fastening the whole cell.

Figure 4:
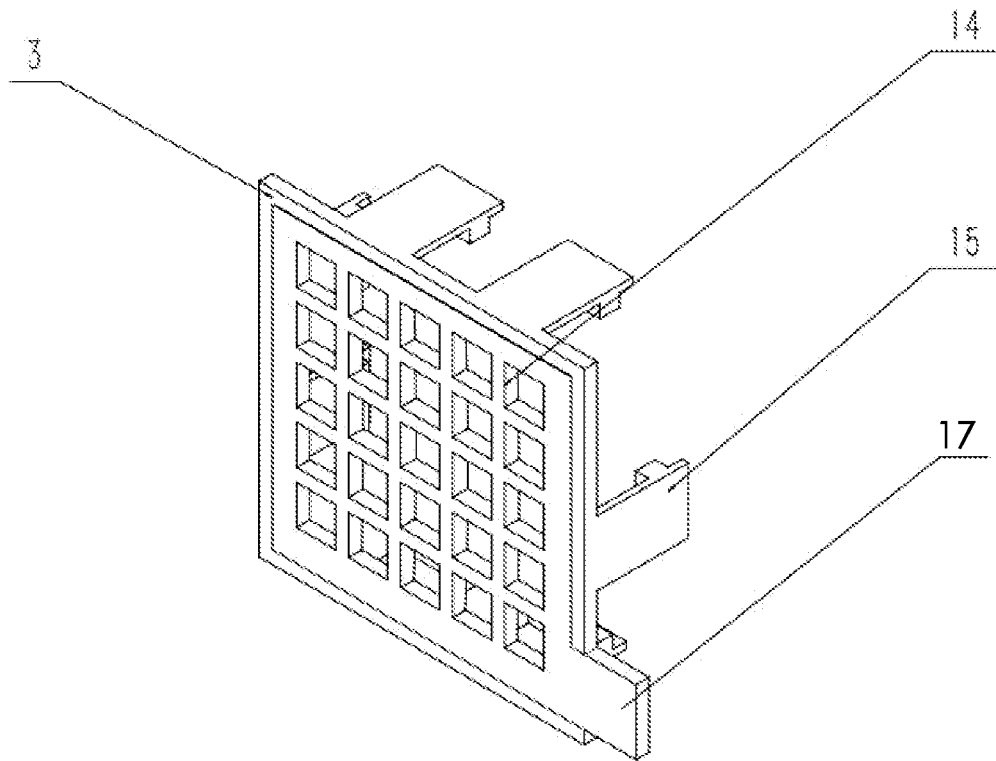
FIG. 4 is an enlarged axonometric drawing of a sealing-fastening-integrated current-collector according to the preferred embodiment of the present invention.
Figure 5:
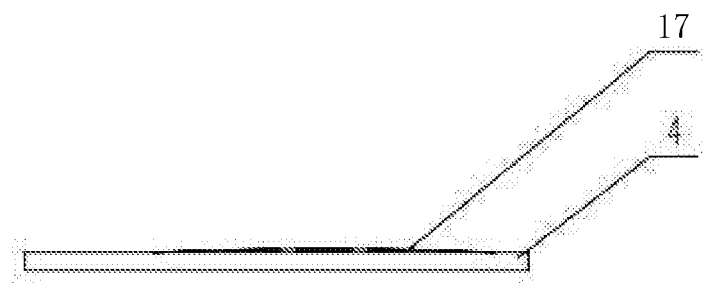
FIG. 5 is an enlarged side view of a convex structure of a cathode current collector according to the preferred embodiment of the present invention.

As showed in FIG. 4, the sealing-fastening-integrated current-collector 3 comprises the cathode current collector 17, the square air holes 14 and the fixed fasteners 15. The cathode current collector 17 is prepared through printing with the conductive 3D printing material, so that the cathode current collector has conducting and collecting effects and a structure thereof is simpler and lighter. Enough square air holes 14 are provided on the cathode current collector 17, so that air fully contacts the cathode electrode. Meanwhile, a plurality of the fixed fasteners 15 are arranged on the cathode current collector 17, which respectively cooperate with the fixed fastening grooves 7 of the current-collector-integrated fuel tank unit 1, thereby sealing and fastening the whole cell. After being fastened, because of an uneven stress, the cathode current collector 17 may be changed in a shape. Thus, the cathode current collector adopts the convex structure 13, so that the stress is evenly distributed on the membrane electrode assembly 2, namely, the membrane electrode assembly 2 evenly contacts the cathode current collector and a resistance is decreased.

The present invention further provides a method for preparing the passive direct liquid fuel cell, comprising steps of:

(1) building models of the current-collector-integrated fuel tank unit and the sealing-fastening-integrated current-collector via the 3D modeling software, printing the models via the 3D printing technology, and then obtaining the current-collector-integrated fuel tank unit 1 and the sealing-fastening-integrated current-collector 3; and (2) successively arranging the anode gasket 8, the anode electrode 9, the ion-exchange membrane 10, the cathode electrode 11 and the cathode gasket 12 on the anode current collector 4 of the current-collector-integrated fuel tank unit 1; then covering the sealing-fastening-integrated current-collector 3 on the membrane electrode assembly 2; inserting the fixed fasteners 15 into the fixed fastening grooves 7, thereby sealing and fastening the whole cell; and finishing production of the cell.

The above embodiment is for illustrating the technical solutions of the present invention, not for limiting the protection scope of the present invention. All modifications based on the technical solutions of the present invention are included in the protection scope of the claims of the present invention.

What is claimed is:

1. A passive direct liquid fuel cell, comprising a current-collector-integrated fuel tank unit (1) and a sealing-fastening-integrated current-collector (3) which are prepared via a three-dimensional (3D) printing technology, wherein: the current-collector-integrated fuel tank unit (1) is fastened with the sealing-fastening-integrated current-collector (3); and a membrane electrode assembly (2) is sandwiched between the current-collector-integrated fuel tank unit and the sealing-fastening-integrated current-collector.

2. The passive direct liquid fuel cell, as recited in claim 1, wherein: the current-collector-integrated fuel tank unit (1)

comprises a fuel tank (5) and an anode current collector (4) which are coupled together; a fuel adding hole (16) and fixed fastening grooves (7) cooperating with the sealing-fastening-integrated current-collector (3) are provided on the fuel tank (5); and square fuel holes (6) are provided on the anode current collector (4).

3. The passive direct liquid fuel cell, as recited in claim 2, wherein a surface of the anode current collector (4) is lower than a surface of the fuel tank (5), which is beneficial to fixing and assembling the membrane electrode assembly.

4. The passive direct liquid fuel cell, as recited in claim 2, wherein: the sealing-fastening-integrated current-collector (3) comprises a cathode current collector (17) which serves as a main part; on a surface of the cathode current collector (17), a convex structure (13) is set, and a plurality of air holes (14) corresponding to the fuel holes (6) on the anode current collector (4) are provided; and a plurality of fixed fasteners (15), which respectively cooperate with the fixed fastening grooves (7) on the fuel tank (5), are arranged around the cathode current collector (17).

5. The passive direct liquid fuel cell, as recited in claim 1, wherein: the membrane electrode assembly (2) comprises an ion-exchange membrane (10) sandwiched between an anode electrode (9) and a cathode electrode (11); and, an anode gasket (8) and a cathode gasket (12) are respectively placed on outer sides of the anode electrode (9) and the cathode electrode (11), for avoiding fuel leakage.

6. A method for preparing a passive direct liquid fuel cell, comprising steps of:
   (1) building models of a current-collector-integrated fuel tank unit and a sealing-fastening-integrated current-collector via a 3D modeling software, printing the models via a 3D printing technology, and then obtaining the current-collector-integrated fuel tank unit (1) and the sealing-fastening-integrated current-collector (3); and
   (2) successively arranging an anode gasket (8), an anode electrode (9), an ion-exchange membrane (10), a cathode electrode (11) and a cathode gasket (12) on an anode current collector (4) of the current-collector-integrated fuel tank unit (1); then covering the sealing-fastening-integrated current-collector (3) on a membrane electrode assembly (2); inserting fixed fasteners (15) into fixed fastening grooves (7), so as to seal and fasten the whole cell; and finishing production of the whole wherein:

the passive direct liquid fuel cell comprises the current-collector-integrated fuel tank unit (1) and the sealing-fastening-integrated current-collector (3) which are prepared via the 3D printing technology, wherein: the current-collector-integrated fuel tank unit (1) is fastened with the sealing-fastening-integrated current-collector (3); and the membrane electrode assembly (2) is sandwiched between the current-collector-integrated fuel tank unit and the sealing-fastening-integrated current-collector;

the current-collector-integrated fuel tank unit (1) comprises a fuel tank (5) and the anode current collector (4) which are coupled together; a fuel adding hole (16) and the fixed fastening grooves (7) cooperating with the sealing-fastening-integrated current-collector (3) are provided on the fuel tank (5); and square fuel holes (6) are provided on the anode current collector (4);

a surface of the anode current collector (4) is lower than a surface of the fuel tank (5), which is beneficial to fixing and assembling the membrane electrode assembly;

the sealing-fastening-integrated current-collector (3) comprises a cathode current collector (17) which serves as a main part; on a surface of the cathode current collector (17), a convex structure (13) is set, and a plurality of air holes (14) corresponding to the fuel holes (6) on the anode current collector (4) are provided; and the plurality of fixed fasteners (15), which respectively cooperate with the fixed fastening grooves (7) on the fuel tank (5), are arranged around the cathode current collector (17); and the membrane electrode assembly (2) comprises the ion-exchange membrane (10) sandwiched between the anode electrode (9) and the cathode electrode (11); and, the anode gasket (8) and the cathode gasket (12) are respectively placed on outer sides of the anode electrode (9) and the cathode electrode (11), for avoiding fuel leakage.

\* \* \* \* \*